Dec. 18, 1945.  G. H. AKLIN  2,391,114
RAPID OBJECTIVE
Filed Nov. 30, 1943
FIG. 1.
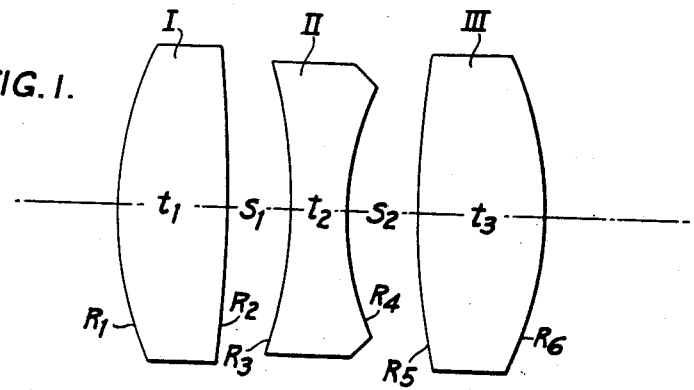
FIG. 2.
| EF = 100 mm. | | | | f/2.25 | |
|---|---|---|---|---|---|
| LENS | N | V | RADII | | THICKNESSES |
| I | 1.755 | 47.2 | $R_1$ = | + 54.1 | $t_1$ = 16.1 |
| | | | $R_2$ = | − 552. | $S_1$ = 9.4 |
| II | 1.720 | 29.3 | $R_3$ = | − 70. | $t_2$ = 8.1 |
| | | | $R_4$ = | + 43. | $S_2$ = 10.2 |
| III | 1.734 | 51.1 | $R_5$ = | + 140.7 | $t_3$ = 17.9 |
| | | | $R_6$ = | − 53.2 | B.F. = 73.5 |
FIG. 3.
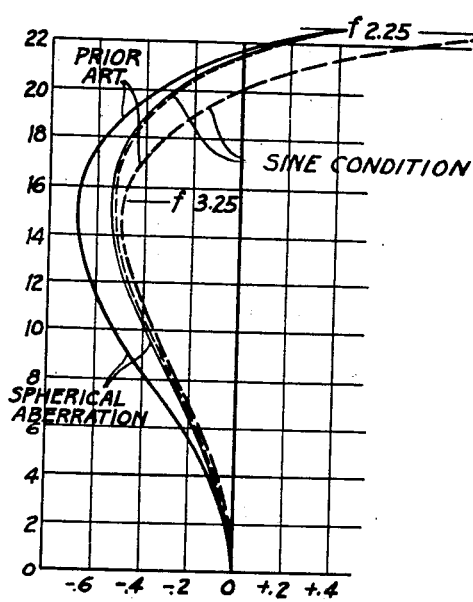
FIG. 4.
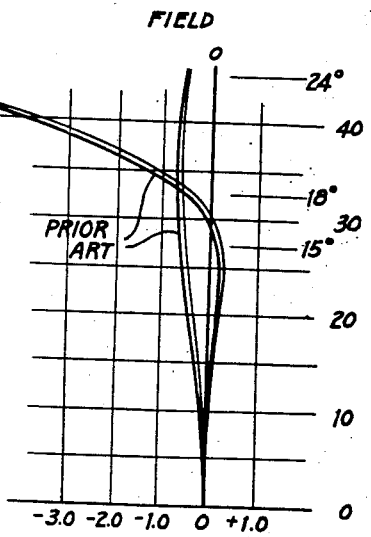
GEORGE H. AKLIN
INVENTOR
BY
ATT'Y & AG'T Patented Dec. 18, 1945

2,391,114

UNITED STATES PATENT OFFICE 2,391,114

RAPID OBJECTIVE

George H. Aklin, Rochester, N. Y., assignor to Eastman Kodak Company, Rochester, N. Y., a corporation of New Jersey Application November 30, 1943, Serial No. 512,325

3 Claims. (Cl. 88—57)

This invention relates to photographic objectives of the type consisting of three simple air spaced elements of which the inner one is biconcave with its weaker surface forward and the outer two are biconvex with their respective stronger surfaces outward.

An object of the invention is to provide a fully corrected objective of the type described and with reduced zonal spherical aberration.

According to the invention, the refractive indices of both positive elements are between 1.65 and 1.85, and the negative element has a lower refractive index and dispersive index than either positive element.

It is advantageous to make the positive elements weak. Preferably the sum of their two focal lengths is between 1.15 and 1.30 times the focal length of the objective.

In the most preferred form of the invention the respective radii designated by "R" numbered from front to rear are between the limits shown in the following table:

| | | |
|---|---|---|
| $0.36F$ < | $R_1$ < | $0.60F$ |
| $2.0F$ < | $R_2$ < | $\infty$ |
| $0.45F$ < | $R_3$ < | $0.90F$ |
| $0.30F$ < | $R_4$ < | $0.53F$ |
| $1.25F$ < | $R_5$ < | $\infty$ |
| $0.46F$ < | $R_6$ < | $0.62F$ | where "F" is the focal length of the objective. By "front" is meant the long conjugate side in accordance with the usual convention.

In the accompanying drawing:

Fig. 1 shows an axial section of an objective according to the invention;

Fig. 2 shows constructional data for a preferred embodiment of the invention; and Figs. 3 and 4 show the spherical aberration curve and the field curve for the example shown in Fig. 2 and corresponding curves for one of the best lenses of this type previously known.

Data is given here in the conventional form for two examples of objectives according to the invention. The second of these examples is also shown in Fig. 2.

*Example 1*

| EF=100 | | | Aperture=f/2.5 | |
|---|---|---|---|---|
| Lens | N | V | Radii | Thicknesses |
| I | 1.745 | 46.4 | $R_1=+47.1$ | $t_1=16.7$ |
| | | | $R_2=-468.5$ | $s_1=7.2$ |
| II | 1.720 | 29.3 | $R_3=-72.7$ | $t_2=3.5$ |
| | | | $R_4=+40.0$ | $s_2=11.6$ |
| III | 1.734 | 51.1 | $R_5=+168.3$ | $t_3=17.8$ |
| | | | $R_6=-56.4$ | B. F.=73.3 |

*Example 2, Fig. 2*

| EF=100 | | | Aperture=f/2.25 | |
|---|---|---|---|---|
| Lens | N | V | Radii | Thicknesses |
| I | 1.755 | 47.2 | $R_1=+54.1$ | $t_1=16.1$ |
| | | | $R_2=-552$ | $s_1=9.4$ |
| II | 1.720 | 29.3 | $R_3=-70.0$ | $t_2=8.1$ |
| | | | $R_4=+43.0$ | $s_2=10.2$ |
| III | 1.734 | 51.1 | $R_5=+140.7$ | $t_3=17.9$ |
| | | | $R_6=-53.2$ | B. F.=73.5 |

Example 2 has a somewhat larger aperture, but Example 1 covers a slightly larger angular field.

It will be noted from Figs. 3 and 4 that the zonal spherical aberration and coma are considerably improved sine conditions and the field curvature and astigmatism are about the same, or if anything slightly improved, as compared with the best prior art. The spherical aberration is about the same at the margin, but in improved at the intermediate zones sine condition and the coma is about the same at the seven-tenths zone, but is improved at the margin. The difference between the spherical aberration and the sine condition curves is a measure of coma and it will be noted from Fig. 3 that the prior art curves are considerably spaced representing a large amount of coma whereas the curves for the present lens are practically superimposed.

What I claim is:

1. An objective consisting of three simple air spaced elements of which the inner one is biconcave with its weaker surface forward and the outer two are biconvex with their respective stronger surfaces outward, characterized by the refractive indices of both positive elements being between 1.65 and 1.85 and by the negative element having a lower refractive index and dispersive index than each of the positive elements and also characterized by the sum of the focal lengths of the positive elements being between 1.15 and 1.30 times the focal length of the objective.

2. An objective consisting of three simple air spaced elements of which the inner one is biconcave with its weaker surface forward and the outer two are biconvex, characterized by the refractive indices of both positive elements being between 1.65 and 1.85, by the negative element having a lower refractive index and dispersive index than either of the positive elements, and by the sum of the focal lengths of the positive elements being between 1.15 and 1.30 times the focal length of the objective, and in which the respective radii R numbered from front to rear are between the limits shown in the following table:

$$0.36F < R_1 < 0.60F$$
$$2.0F < R_2 < \infty$$
$$0.45F < R_3 < 0.90F$$
$$0.30F < R_4 < 0.53F$$
$$1.25F < R_5 < \infty$$
$$0.46F < R_6 < 0.62F$$

where "F" is the focal length of the objective.

3. An objective substantially as specified in the following table:

| Lens | N | V | Radii | Thicknesses |
|---|---|---|---|---|
| I | 1.75 | 47 | $R_1 = +0.5F$ | $t_1 = 0.17F$ |
|   |   |   | $R_2 = -5F$ | $s_1 = 0.07F$ |
| II | 1.72 | 29 | $R_3 = -0.7F$ | $t_2 = 0.04F$ |
|   |   |   | $R_4 = +0.4F$ | $s_2 = 0.12F$ |
| III | 1.73 | 51 | $R_5 = +1.4F$ | $t_3 = 0.18F$ |
|   |   |   | $R_6 = -0.5F$ |   | where the first column gives the lens elements in Roman numerals in order from front to rear, N is the index of refraction for the D line of the spectrum, V is the dispersive index, R, t, and s, refer respectively to the radii of curvature of the refractive surfaces, the thicknesses of the elements, and the airspace between the elements, the subscripts on these refer to the surfaces, the elements, and the spaces, numbered consecutively from the front, F is the focal length of the objective, and the + and − signs in the fourth column correspond to surfaces which are respectively convex and concave to the front.

GEORGE H. AKLIN.